(12) United States Patent
Koorapaty et al.

(10) Patent No.: US 6,631,124 B1
(45) Date of Patent: Oct. 7, 2003

(54) METHODS AND APPARATUS FOR ALLOCATING RESOURCES IN HYBRID TDMA COMMUNICATION SYSTEMS

(75) Inventors: Havish Koorapaty, Cary, NC (US); Yi-Pin Eric Wang, Cary, NC (US); Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/432,989

(22) Filed: Nov. 3, 1999

(51) Int. Cl.[7] .................................................. H04J 3/00
(52) U.S. Cl. ..................... 370/337; 370/468; 370/335; 370/342; 370/348; 370/461
(58) Field of Search ................................ 370/337, 336, 370/343, 347, 348, 329, 330, 335, 342, 465, 321, 468

(56) References Cited

U.S. PATENT DOCUMENTS

| | | | | | |
|---|---|---|---|---|---|
| 5,654,968 | A | * | 8/1997 | Smiroldo | 370/443 |
| 5,956,642 | A | | 9/1999 | Larsson et al. | 455/449 |
| 6,014,374 | A | * | 1/2000 | Paneth et al. | 370/345 |
| 6,018,528 | A | * | 1/2000 | Gitlin et al. | 370/436 |
| 6,078,576 | A | * | 6/2000 | Schilling et al. | 370/347 |
| 6,175,550 | B1 | * | 1/2001 | van Nee | 370/206 |
| 6,405,039 | B1 | * | 6/2002 | Koorapaty et al. | 455/434 |
| 6,407,993 | B1 | * | 6/2002 | Moulsley | 370/347 |

FOREIGN PATENT DOCUMENTS

EP   0 680 168 A2   11/1995
GB   2 290 928      1/1996

OTHER PUBLICATIONS

International Search report, PCT/US00/26665, Mar. 12, 2001.

* cited by examiner

*Primary Examiner*—William Trost
*Assistant Examiner*—Sharad Rampuria
(74) *Attorney, Agent, or Firm*—Myers Bigel Sibley & Sajovec

(57) ABSTRACT

A wireless communications system including at least one base station operative to communicate with terminals on a plurality of carrier frequencies in repetitive time slots defined thereon is operated by assigning an entire time slot or a spreading-code defined subchannel of a time slot to a terminal based on a communications constraint associated with the terminal. The communications constraint may include a performance requirement, such as an information rate or an error rate, and a signal reception condition, such as signal to noise ratio. According to another aspect, a wireless communications system determines a communications constraint associated with a terminal. The system assigns a time slot, a spreading code, a coding rate and a bandwidth to the terminal based on the determined communications constraint. Preferably, the system assigns a time slot, a spreading code, a coding rate and a bandwidth to the terminal such that at least one of an available bandwidth, a number of available time slots, and a number of available spreading codes is optimized. Related apparatus are also described.

46 Claims, 10 Drawing Sheets

METHODS AND APPARATUS FOR ALLOCATING RESOURCES IN HYBRID TDMA COMMUNICATION SYSTEMS

BACKGROUND OF THE INVENTION

The present invention relates to communications methods and apparatus, and more particularly, to methods and apparatus for allocating resources in wireless communications.

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (mobile terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity.

Modem digital wireless systems typically utilize different multiple access techniques such as time division multiple access (TDMA) and code division multiple access (CDMA) to provide increased spectral efficiency. In TDMA systems, such as those conforming to the GSM or IS-136 standards, carrier frequencies are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Hybrid TDMA/CDMA systems have been proposed. Examples of such systems are described in U.S. Pat. No. 5,790,549 to Dent (issued Aug. 4, 1998), U.S. Pat. No. 5,566,168 to Dent (issued Oct. 15, 1996), U.S. Pat. 5,539,730 to Dent (issued Jul. 23, 1996), U.S. Pat. No. 5,481,533 to Honig et al. (issued Jan. 2, 1996) and in the "Draft PCS2000 Standard (PN-3390)," offered to the Joint Technical Committee on Wireless Access JCT(Air) by the Technical Ad Hoc Group (TAG) One (Omnipoint Corporation), Oct. 31, 1994.

Recently, wireless communications systems have seen a rapidly increasing demand for services other than transmission, including, for example, text messaging and multimedia services such as internet access, video and the like. Each of these services typically has different performance requirements. As it would generally be impractical to provide separate wireless infrastructures for each of these services, there is a need for wireless communications apparatus and methods whereby multiple services with differing performance requirements can utilize a common infrastructure in an effective and efficient manner.

SUMMARY OF THE INVENTION

According to the present invention, a terminal is assigned to an entire time slot or to a subchannel of a time slot defined by a spreading code based on one or more communications constraints associated with the terminal, e.g., based on a performance requirement, such as information rate or bit error rate, associated with the terminal, and a signal reception condition, such a signal to noise ratio, under which the terminal is operating. According to an aspect of the present invention, this assignment is performed such that system resources, such as the number of available time slots, available bandwidth, available spreading codes, and transmit power are optimized. In this manner, multiple services having varying performance requirements can be efficiently served by a common wireless infrastructure.

In particular, according to an aspect of the present invention, a wireless communications system including at least one base station operative to communicate on a plurality of carrier frequencies in repetitive time slots defined thereon is operated by assigning an entire time slot or a spreading-code defined subchannel of a time slot to a terminal based on a communications constraint associated with the terminal. The communications constraint may include a performance requirement, such as an information rate or an error rate, and a signal reception condition, such as signal to noise ratio.

According to an embodiment of the present invention, a single terminal is identified and a communications constraint associated with the single terminal is identified. A plurality of other terminals is also identified, and respective communications constraints associated with respective ones of the plurality of terminals are determined. A first time slot is exclusively assigned to the single terminal based on the communications constraint associated with the single terminal. A second time slot is assigned to the plurality of terminals based on the communications constraints associated with the plurality of terminals. The system communicates with the single terminal using the first time slot, and communicates with respective ones of the plurality of terminals in the second time slot using respective subchannels, wherein respective ones of the plurality of channels are encoded according to respective spreading codes, which may be direct-sequence spreading codes or scrambling masks.

The system may communicate with the single terminal at a first information rate, and may communicate with a terminal of the plurality of terminals at a second information rate lower than the first information rate. Multiple subchannels of the second time slot may be assigned to one of the terminals of the plurality of terminals. According to another embodiment of the present invention, the second time slot is assigned to a high-penetration channel, such that the subchannels represent subchannels of the high-penetration channel.

According to another aspect of the present invention, methods of operating a wireless communications system are provided. The wireless communications system is operative to communicate with terminals using a plurality of time slots on a plurality of carrier frequencies, to communicate on respective subchannels on a time slot according to respective spreading codes and to communicate over a channel with a variable coding rate and a variable bandwidth. The system determines a communications constraint associated with a terminal. The system assigns a time slot, a spreading code, a coding rate and a bandwidth to the terminal based on the determined communications constraint.

The communications constraint may include a performance requirement and a signal reception condition. The performance requirement may include at least one of an information rate or an error rate. The signal reception condition may include a signal to noise ratio. The system may assign a time slot, a spreading code, a coding rate and a bandwidth to the terminal such that at least one of an available bandwidth, a number of available time slots, and a number of available spreading codes is optimized.

According to another aspect of the present invention, a wireless communications system operative to communicate on a plurality of carrier frequencies in repetitive time slots defined thereon includes means for determining a communications constraint associated with a terminal. Means, responsive to the means for determining a communications constraint, are provided for assigning one of an entire time slot or a spreading-code defined subchannel of a time slot to the terminal based on the determined communications constraint. Means are also provided for communicating with the terminal on the assigned entire time slot or subchannel.

According to another aspect of the present invention, a wireless communications system includes means for determining a communications constraint associated with a terminal, and means, responsive to the means for determining a communications constraint, for assigning a time slot, a spreading code, a coding rate and a bandwidth to the terminal based on the determined communications constraint. Preferably, the assigning means assigns a time slot, a spreading code, a coding rate and a bandwidth to the terminal such that at least one of an available bandwidth, a number of available time slots, a number of available spreading codes, or a transmit power is optimized.

According to yet another aspect of the present invention, a wireless communications system includes a base station operative to communicate using a plurality of time slots on a plurality of carrier frequencies, to communicate on respective subchannels on a time slot according to respective spreading codes and to communicate over a channel with a variable coding rate and a variable bandwidth. A resource allocator is operatively associated with the base station and operative to determine a communications constraint associated with a terminal and to assign a time slot, a spreading code, a coding rate and a bandwidth to the terminal based on the determined communications constraint. The base station is responsive to the resource allocator to communicate with the terminal according to the assigned time slot, spreading code, coding rate and bandwidth. Preferably, the resource allocator is operative to assign a time slot, a spreading code, a coding rate and a bandwidth to the terminal such that at least one of an available bandwidth, a number of available time slots, a number of available spreading codes, or a transmit power is optimized.

According to yet another aspect of the present invention, a terminal for communicating with a wireless communications system includes means for informing the system of a communications constraint associated with the terminal, and means for communicating with the system using a time slot, a spreading code, a coding rate and a bandwidth assigned to the terminal by the system based on the determined communications constraint. According to an embodiment of the present invention, the terminal includes means for communicating with the system using an entire time slot or a subchannel of a time slot defined by a spreading code.

DETAILED DESCRIPTION OF THE DRAWINGS

Figure 1:
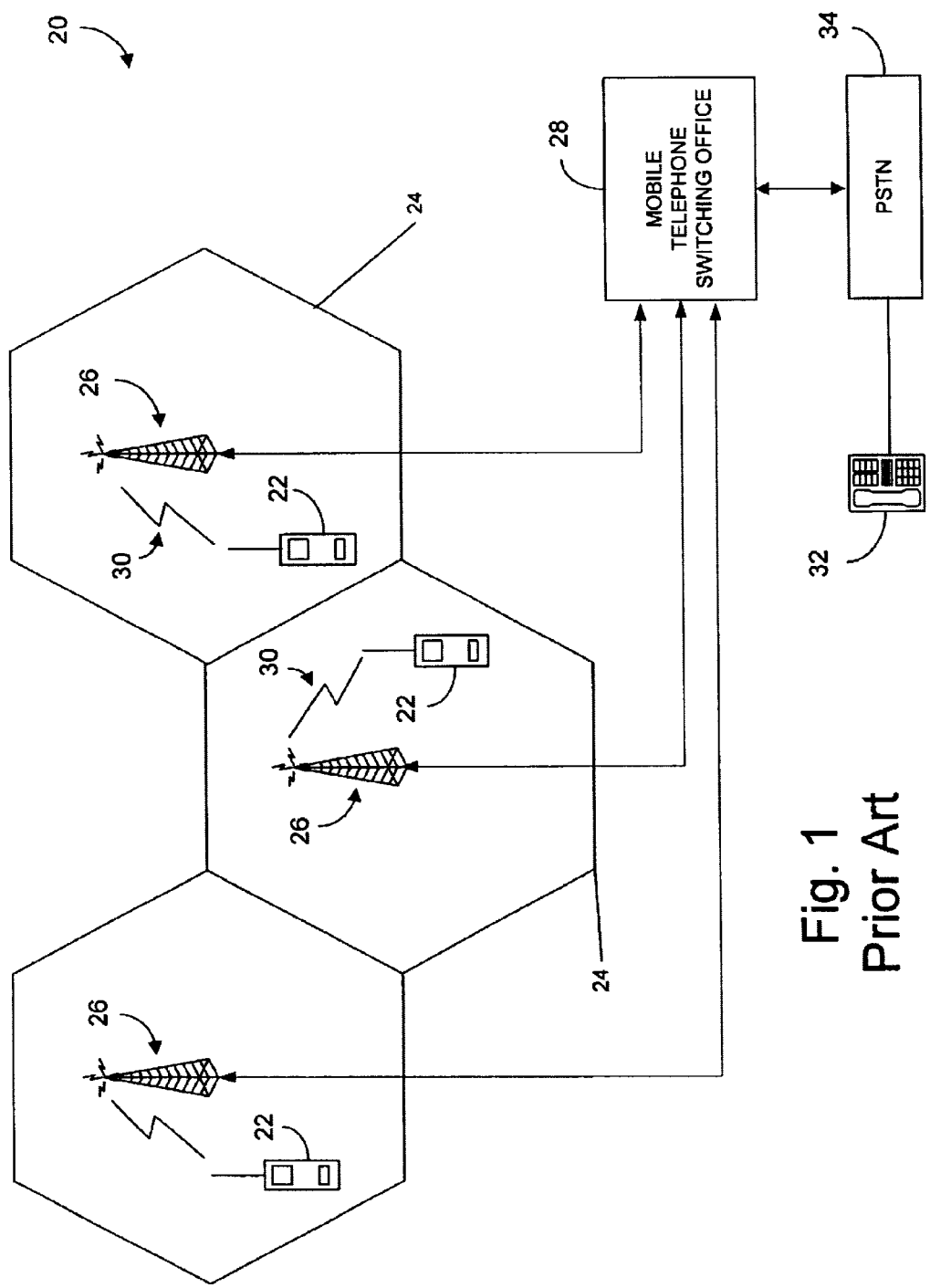
FIG. 1 is a schematic diagram illustrating a conventional terrestrial cellular communications system.
Figure 2:
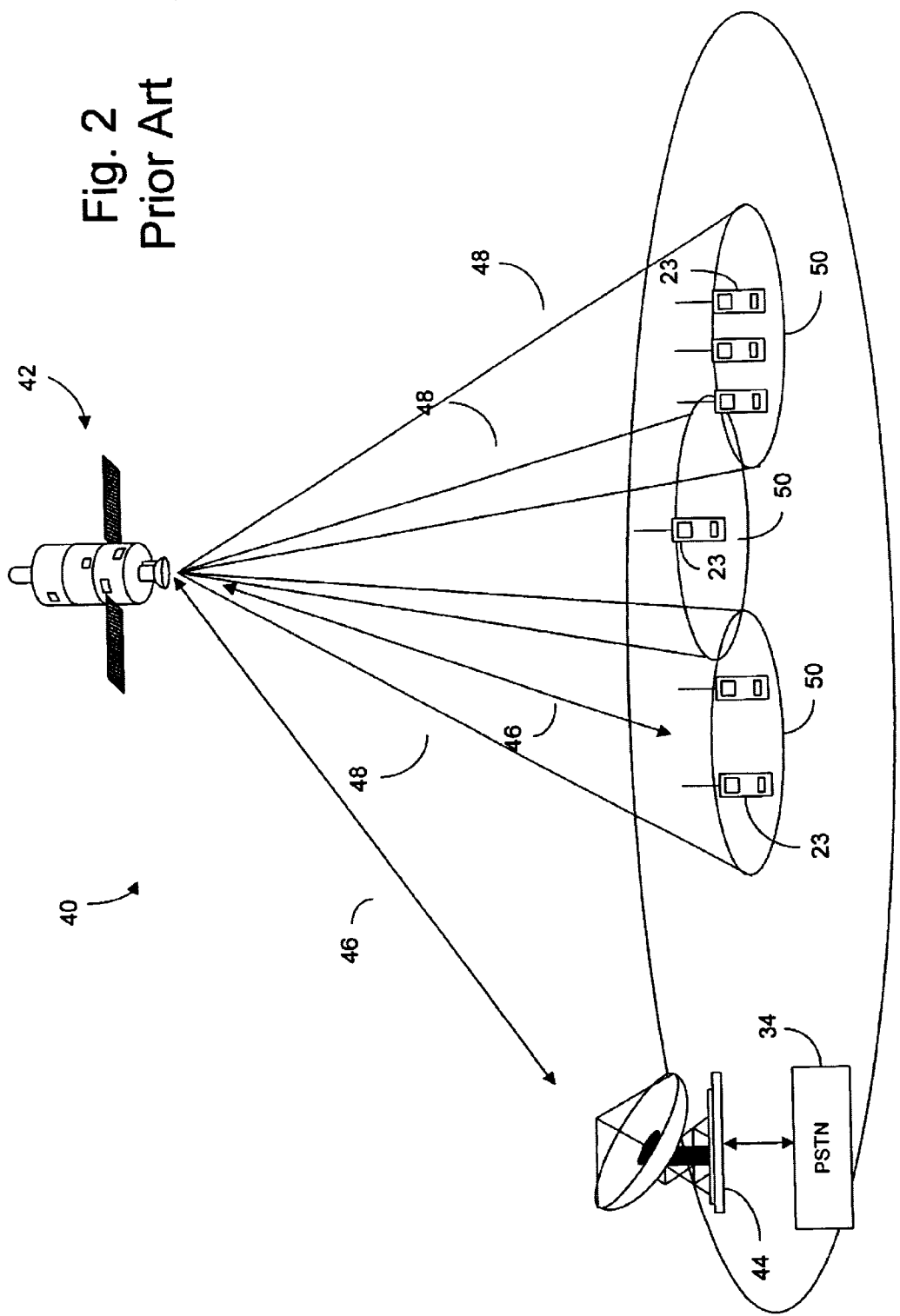
FIG. 2 is a schematic diagram illustrating a conventional satellite based wireless communications system.

The present invention now will be described more fully hereinafter with reference to the accompanying drawings, in which preferred embodiments of the invention are shown. This invention may, however, be embodied in many different forms and should not be construed as limited to the embodiments set forth herein;

rather, these embodiments are provided so that this disclosure will be thorough and complete, and will fully convey the scope of the invention to those skilled in the art.

In the drawings, like numbers refer to like elements.

Figure 3:
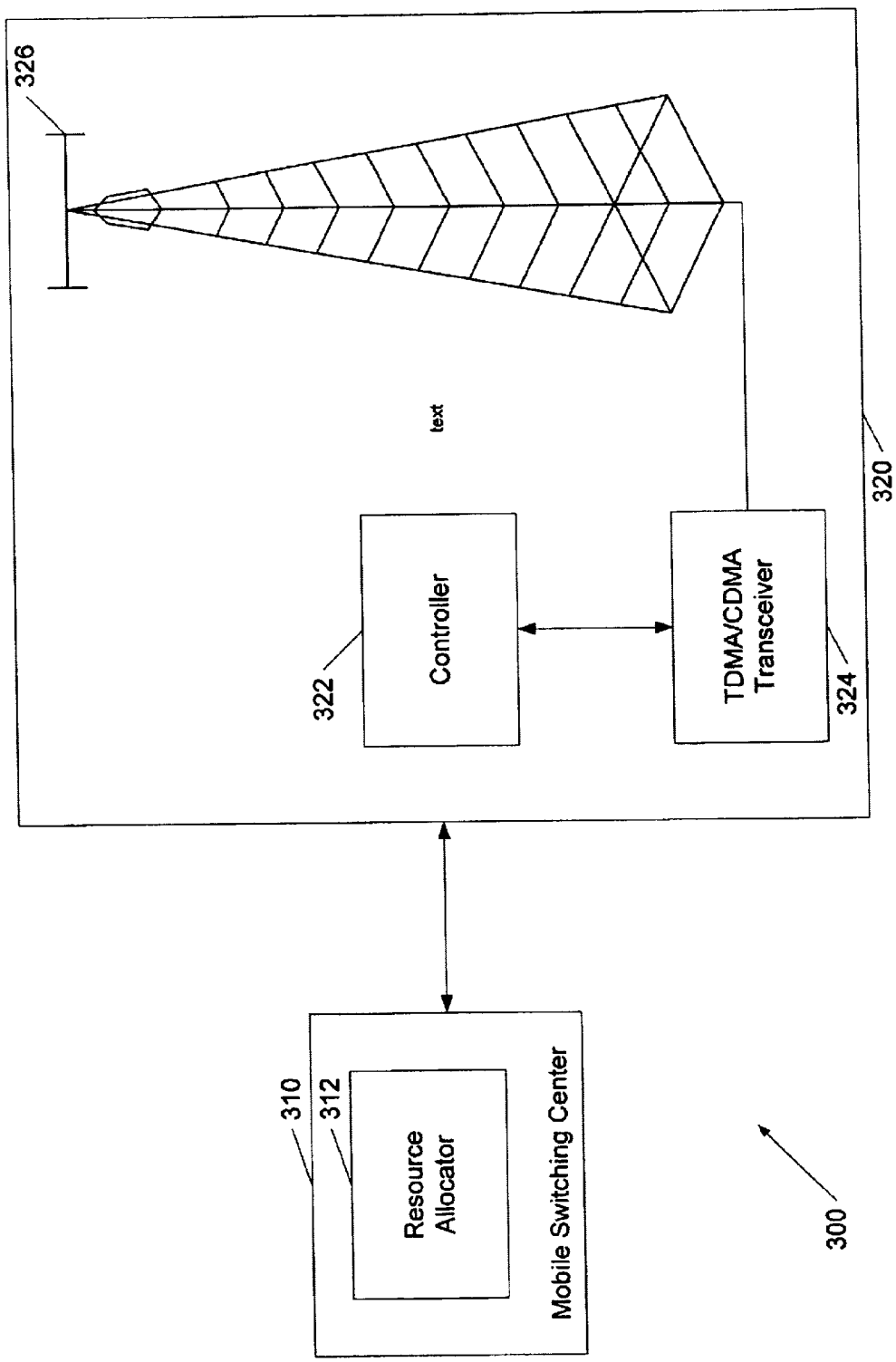
FIG. 3 is a schematic diagram illustrating an exemplary wireless communications system according to an embodiment of the present invention.

Portions of a wireless communications system 300 in which the present invention may be embodied are illustrated in FIG. 3. The wireless communications system 300 includes a base station 320 and a resource allocator 312. The base station 320 includes an antenna 326, a hybrid TDMA/CDMA transceiver 324, and controller 322 that controls the operations of the transceiver 324. It will be appreciated that the base station 320 may include a number of other components, such as power supplies and other support equipment, and that the TDMA/CDMA transceiver 324 may include various combinations of components such as mixers, demodulators, decoders, timing generators, and a variety of other communications components. The detailed operations of such components are known to those skilled in the art, and a detailed description thereof is not necessary to understanding of the present invention. It will be appreciated that, in general, functions of the base station 320 may be implemented using special-purpose hardware, software and/or firmware executing on special or general purpose computing apparatus, or combinations thereof.

The resource allocator 312 is illustrated as implemented in a mobile switching center 310 coupled to the base station 320. The resource allocator 312 is operative to assign time slots, spreading codes, coding rates, and bandwidth to terminals (not shown) communicating with the base station 320 according to various aspects of the present invention described in greater detail herein. It will be appreciated that although the resource allocator 312 is here illustrated as implemented in the MSC 310, functions of the resource allocator 312 may be implemented in other communications system components, and may, in general, be distributed among commonly-used components of a wireless communications system infrastructure. It will also be appreciated that the resource allocator 312 may be implemented using special-purpose hardware, software and/or firmware executing on special or general purpose computing apparatus, or combinations thereof.

Figure 4:
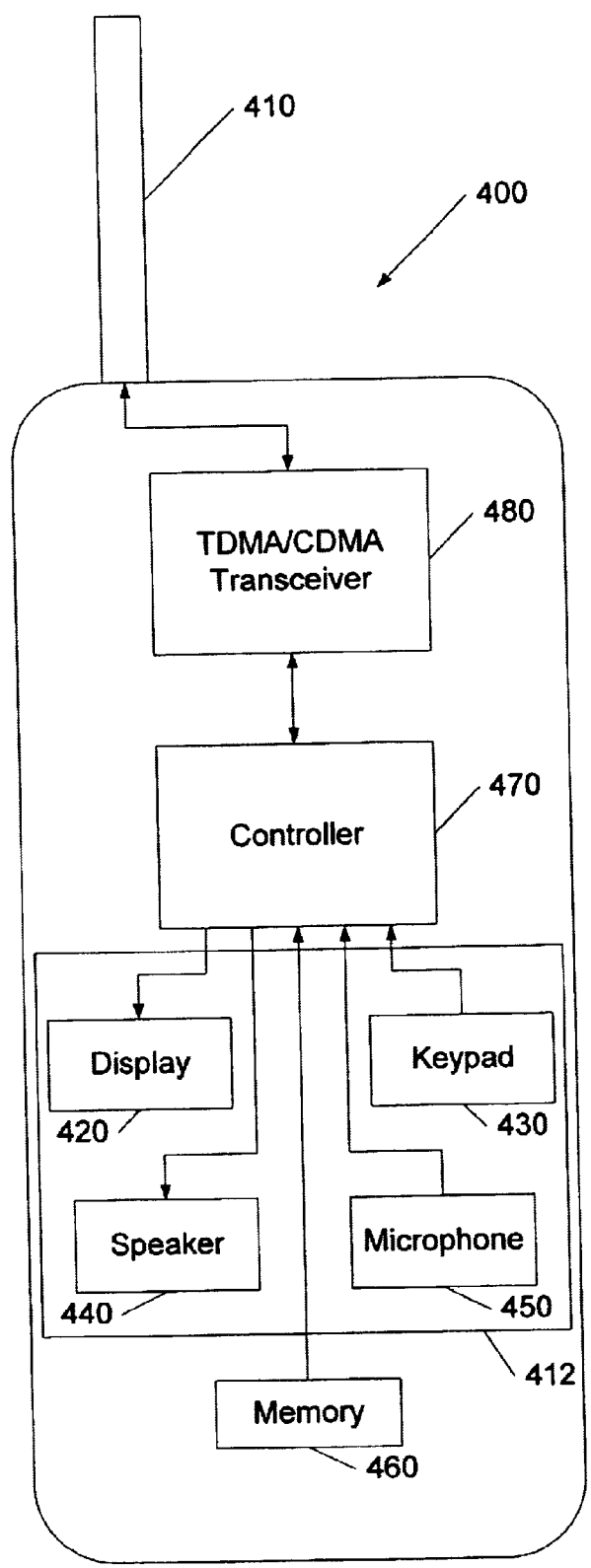
FIG. 4 is a schematic diagram illustrating an exemplary wireless terminal according to an embodiment of the present invention.

FIG. 4 illustrates a wireless terminal 400 in which apparatus and methods according to the present invention may be embodied. The terminal 400 includes an antenna 410 for transmitting and receiving radio frequency (RF) signals. The terminal 400 also includes a user interface 412 including a display 420, a keypad 430, a speaker 440 and a microphone 450. The terminal 400 further includes a controller 470 that controls the operations of the user interface 412, and a TDMA/TDMA transceiver 480 that is coupled to the antenna 410 and controlled by the controller 470. The controller 470 is also operatively associated with a memory 460 of the terminal 400 that stores, for example, program instructions and data used by the controller 470. The TDMA/CDMA transceiver 480 may include various combinations of components such as mixers, demodulators, decoders, timing generators, and a variety of other communications components. The controller 470 may include, for example, a microprocessor, microcontroller or other data processing device that is operative to load and execute computer instructions for performing functions described herein.

Figure 5A:
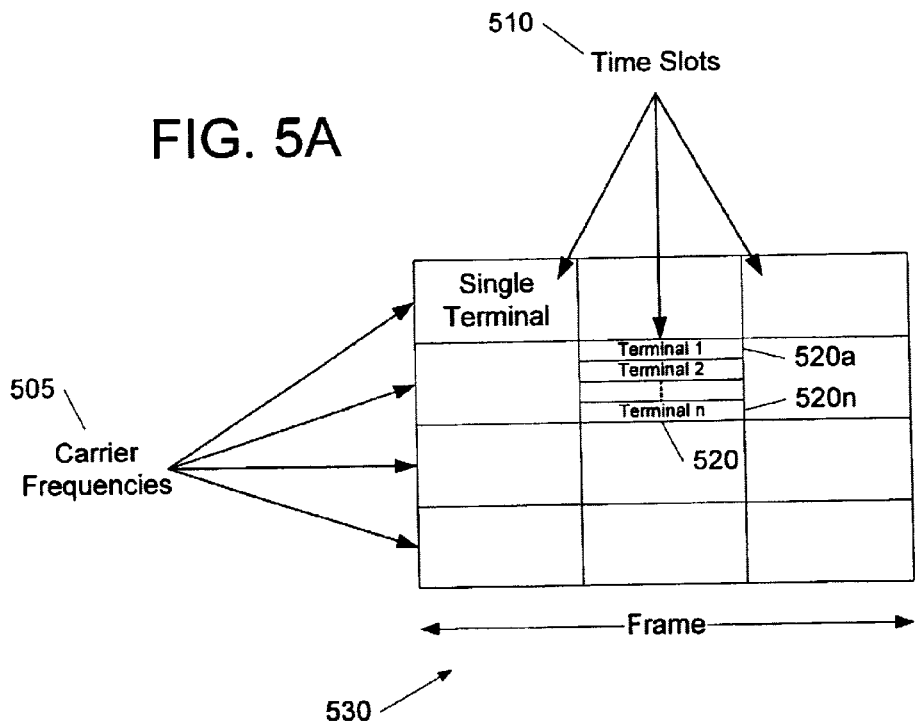
FIGS. 5A–5B are diagrams illustrating exemplary time slot allocations according to an embodiment of the present invention.
Figure 5B:
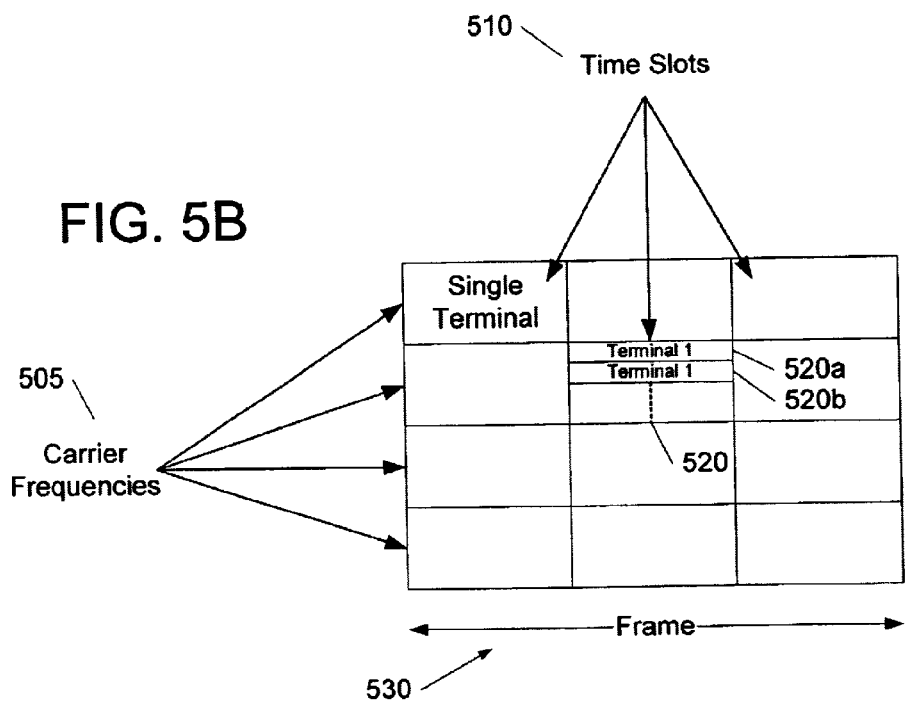

FIGS. 5A–5B illustrate exemplary channel assignments according to the present invention that may be implemented using, for example, the resource allocator 312 of FIG. 3 in conjunction with the base station 320 and a terminal 400 as illustrated in FIG. 4. A plurality of carrier frequencies 505 have repeating frames 530 of time slots 510 defined thereon. An entire time slot 510 or a spreading code defined subchannel 520a–520n of a time slot 520 may be allocated to a terminal based on a communications constraint, e.g., based on a combination of a performance requirement such as information rate and/or error rate and a signal reception condition, such as signal to noise ratio, under which the terminal is operating. For example, an entire time slot 510 may be allocated to a terminal that has a relatively high information rate requirement, e.g., a terminal requesting a high bit rate data service, and/or relatively poor signal reception conditions. However, if the terminal has relatively low performance requirements under good signal reception characteristics, such as those that may be associated with a messaging or similar low data rate service, it may be assigned, along with other terminals, to a spreading code subdivided time slot 520. As illustrated in FIG. 5B, within a subdivided time slot 520, a single terminal may be assigned multiple spreading-code defined subchannels depending on performance requirements and signal reception conditions.

Exemplary Implementation in a System with High-Penetration Services

Aspects of the present invention will now be described with reference to a wireless communications system providing both regular and "high-penetration" services. Examples of such systems are described in U.S. patent application Ser. No. 09/195,790 to Rydbeck et al., filed Nov. 18, 1998, U.S. patent application Ser. No. 09/195,315 to Khayrallah et al., filed Nov. 18, 1998, and U.S. patent application Ser. No. 09/193,261 to Rydbeck et al., filed Nov. 18, 1998, each of which is assigned to the assignee of the present invention and incorporated herein by reference in its entirety.

An exemplary high-penetration system described in the aforementioned U.S. patent application Ser. Nos. 09/195,790, 09/195,315 and 09/193,261, uses one or more traffic channels (repeating time slots of a frame structure) for transmission of a dedicated high-penetration control channel (HP-DCCH) on the downlink and a high-penetration random access channel (HP-RACH) on the uplink in a manner that is compatible with the conventional IS-136 air interface. Additional redundancy is provided on these channels by using orthogonal Walsh-Hadamard codes in addition to the convolutional coding used on a "normal" control channel. The additional coding can provide a significant increase in link margin for the high-penetration channels in comparison to regular channels.

Figure 6:
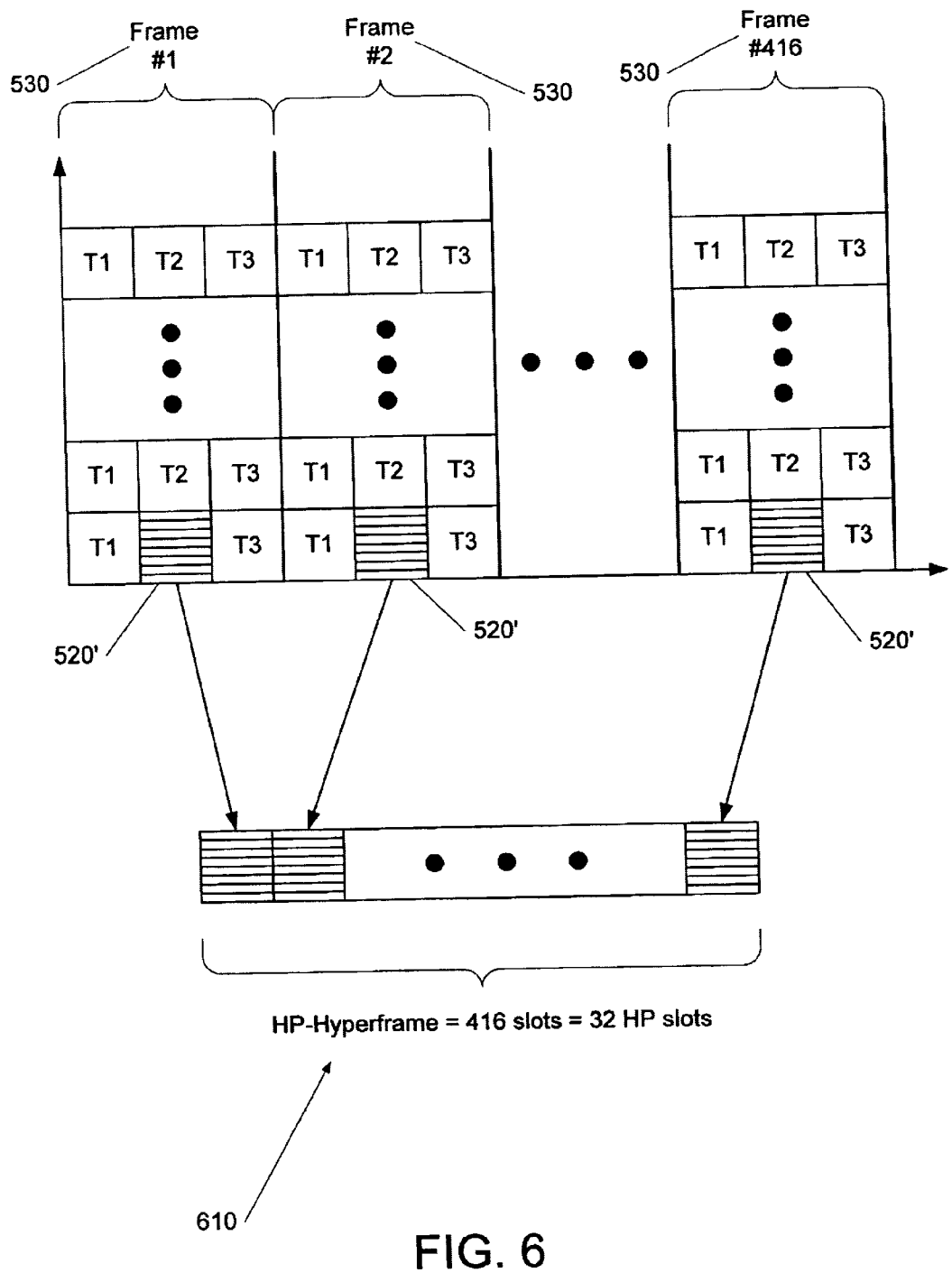
FIG. 6 is a diagram illustrating exemplary subchanneling operations in a high-penetration channel according to an embodiment of the present invention.

As illustrated in FIG. 6, the additional coding results in distribution of a Layer 2 message (which is normally transmitted in a single slot in a regular IS-136 channel) over a series of 13 slots 520' in a series of frames 530, defining a hyperframe 610 of 416 slots that includes 32 "HP slots," i.e., groupings of 13 regular slots assigned to a particular HP channel. As described in U.S. patent application Ser. No. 09/295,180 to Koorapaty et. al, filed Apr. 20, 1999 and incorporated by reference herein in its entirety, these groupings of slots may be organized in various ways based on consideration of message latency, robustness and other performance factors.

Figure 7:
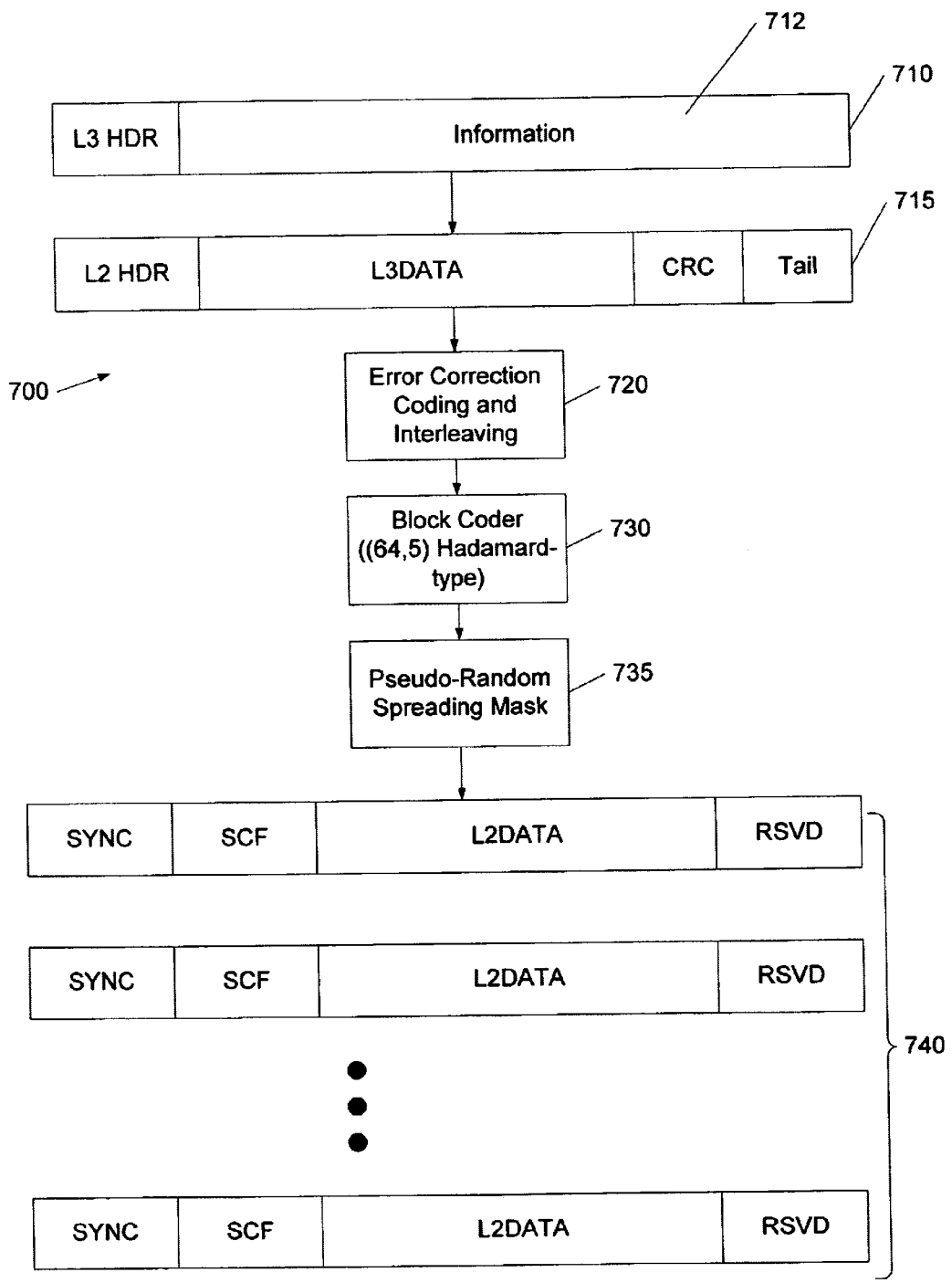
FIG. 7 is a diagram illustrating an exemplary frame structure for high-penetration channels according to an embodiment of the present invention.

Referring now to FIG. 7, according to an embodiment of the present invention, a high-penetration channel may be subdivided further into a plurality of subchannels by application of respective pseudo-random scrambling masks in addition to the additional coding. A Layer 3 message 710, including user information 712 and a header L3 HDR, is included in a Layer 2 message 715. The Layer 2 message 715 also includes a Level 2 header L2 HDR, a cyclic redundancy check value field CRC, and tail bits TAIL. At the Layer 1 (physical) level, error correction coding (e.g., convolutional coding) and interleaving 720 is applied, followed by block coding 730, e.g., a Hadamard-type coding such as a (32, 5) Walsh-Hadamard code with bit repeats. To create a spread-spectrum subchannel, a user-specific scrambling mask is then applied to create data that is placed in a Layer 2 data L2 DATA field included in a series of Layer 1 messages 740 that are transmitted in respective time slots. Each of the Layer 1 messages 740 also includes a synchronization field SYNC, a shared channel feedback field SCF and reserved bits RSVD. It will be appreciated that FIG. 7 illustrates a Layer 1 format compatible with the IS-136 format, and that other message formats may be used with the present invention, including for example, uplink message formats that including guard bits and other data items.

Using the above-described technique, multiple terminals can send and receive messages on a single HP-slot if a system is experiencing high demand. When multiple terminals are assigned to an HP-slot, the HP-slot may be viewed as a code-spread CDMA (CS-CDMA) system in which the terminals achieve channel separation through different scrambling masks (codes). Thus, a TDMA system employing such scrambling-code sub-channeling may be viewed as a TDMA/CS-CDMA system embedded within a TDMA system.

Variations of the operations described with respect to FIG. 7 may be used with the present invention. For example, low-rate convolutional codes or other low-rate codes may be used in place of the Hadamard codes. Direct sequence (DS) CDMA coding may be used in place of CS-CDMA spreading codes (masks). In addition, instead of defining groupings of slots that are assigned to particular groups of terminals (HP-slots), all users of time slots assigned to high-penetration messaging may be assigned respective scrambling masks and transmit in all of the time slots. For example, if each user uses a 1/416 rate error control code and is assigned a particular spreading code, each user may transmit in each of the 416 slots of the HP-hyperframe 610 of FIG. 6. At the receiving end, users are separated using the user-specific scrambling codes. If the CDMA channels are constrained to utilize the same bandwidth as the "pure" TDMA channels, then it is preferable that CDMA channels be used for low bit rate data applications such as Short Message Service (SMS), and that the pure TDMA channels are used for higher information rate services, such as voice services (2–10 kilobits per second (kbps)). However, if the system can expand the bandwidth allocated to the CDMA subchannels of a time slot, these subchannels can also be used for higher information rate services, e.g., for voice and/or high-speed data services. Removing the bandwidth constraint can provide more flexibility in allocating resources in the system, as is explained in greater detail below.

Allocating Resources

A mixed TDMA/CDMA capability as described herein can be used to trade-off link margin with capacity. Consider a scenario for the above-described HP-SMS system in which a HP-DCCH and a HP-RACH initially have ample capacity to handle incident traffic without assigning multiple users to a single slot. In this initial condition, each user can gain additional link margin afforded by the extra coding of the HP channel, and thus gain increased range or in-building penetration. However, if traffic increases such that there are a large number of users requiring low bit rate traffic for applications such as SMS, but a significant number of these users have good signal reception conditions, e.g., good signal to noise ratios, multiple users operating under such good reception conditions can be assigned to a single HP-slot, while a user experiencing poorer signal reception conditions can be assigned exclusively to an HP-slot. In this manner, the system is provided with flexibility in adapting to the particular constraints of users. For example, such an approach may be extremely useful if there are a number of HP-SMS users who are operating under signal reception conditions that are relatively good, but not good enough to use regular control channels. As described above, enhanced flexibility may be provided if bandwidth constraints on the CDMA channels are relaxed. In general, the TDMA/CDMA approaches described herein allow a system to support a large number of users with varying information rate, error rate and other performance requirements and varying signal reception conditions, while optimizing use of system resources.

Figure 8:
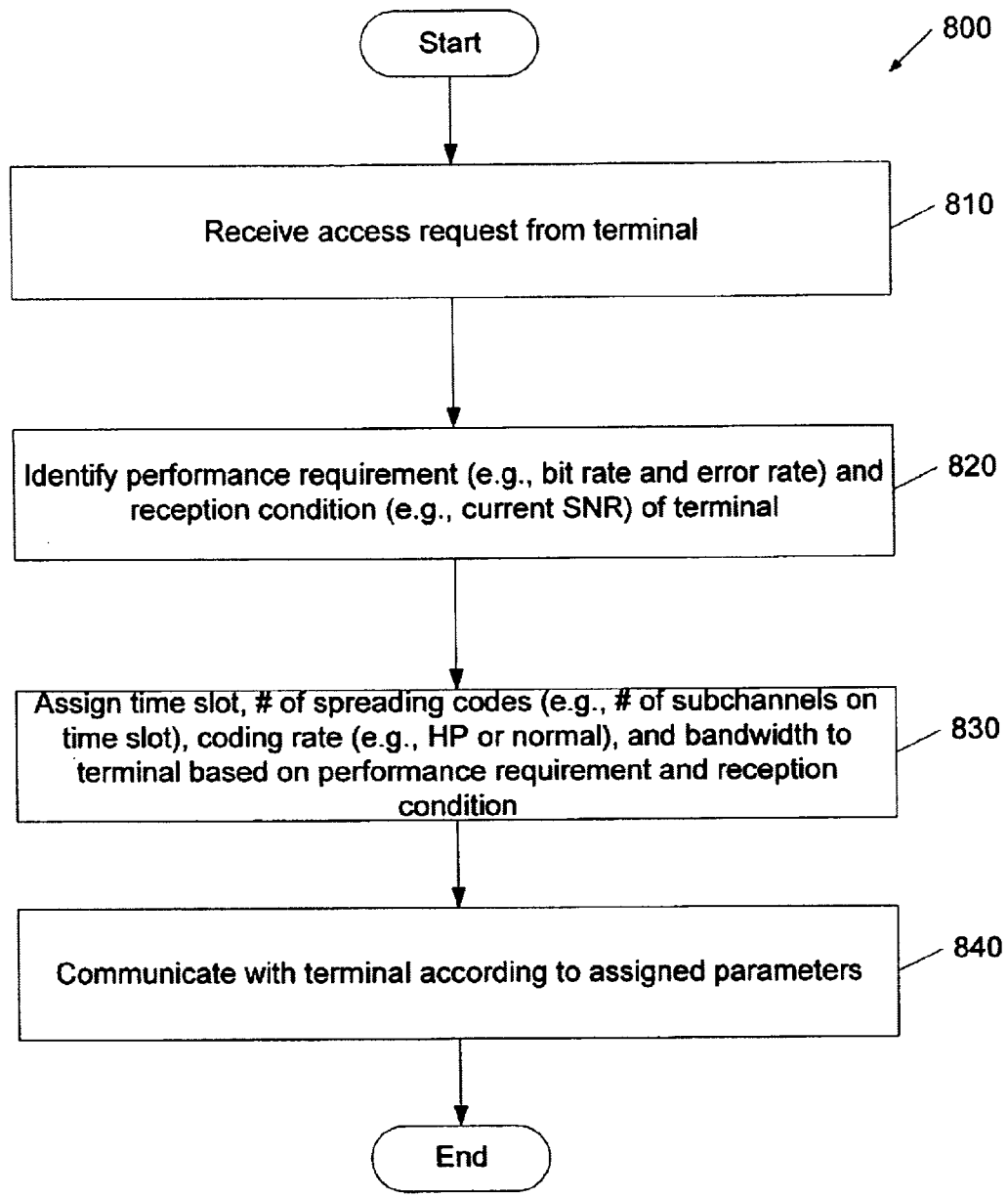
FIGS. 8–10 are flowcharts illustrating exemplary operations for allocating system resources according to various embodiments of the present invention.
Figure 9:
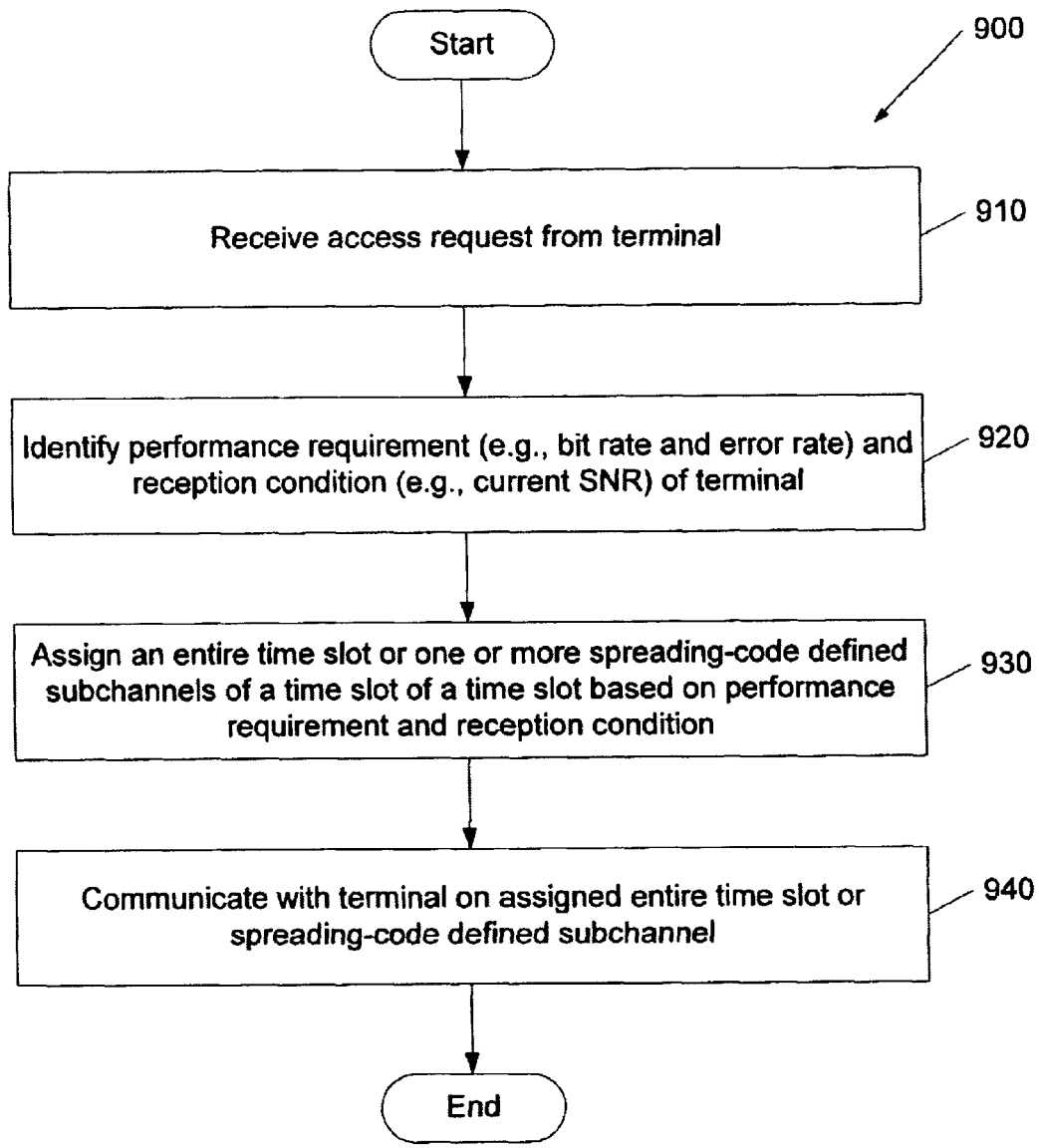
Figure 10:
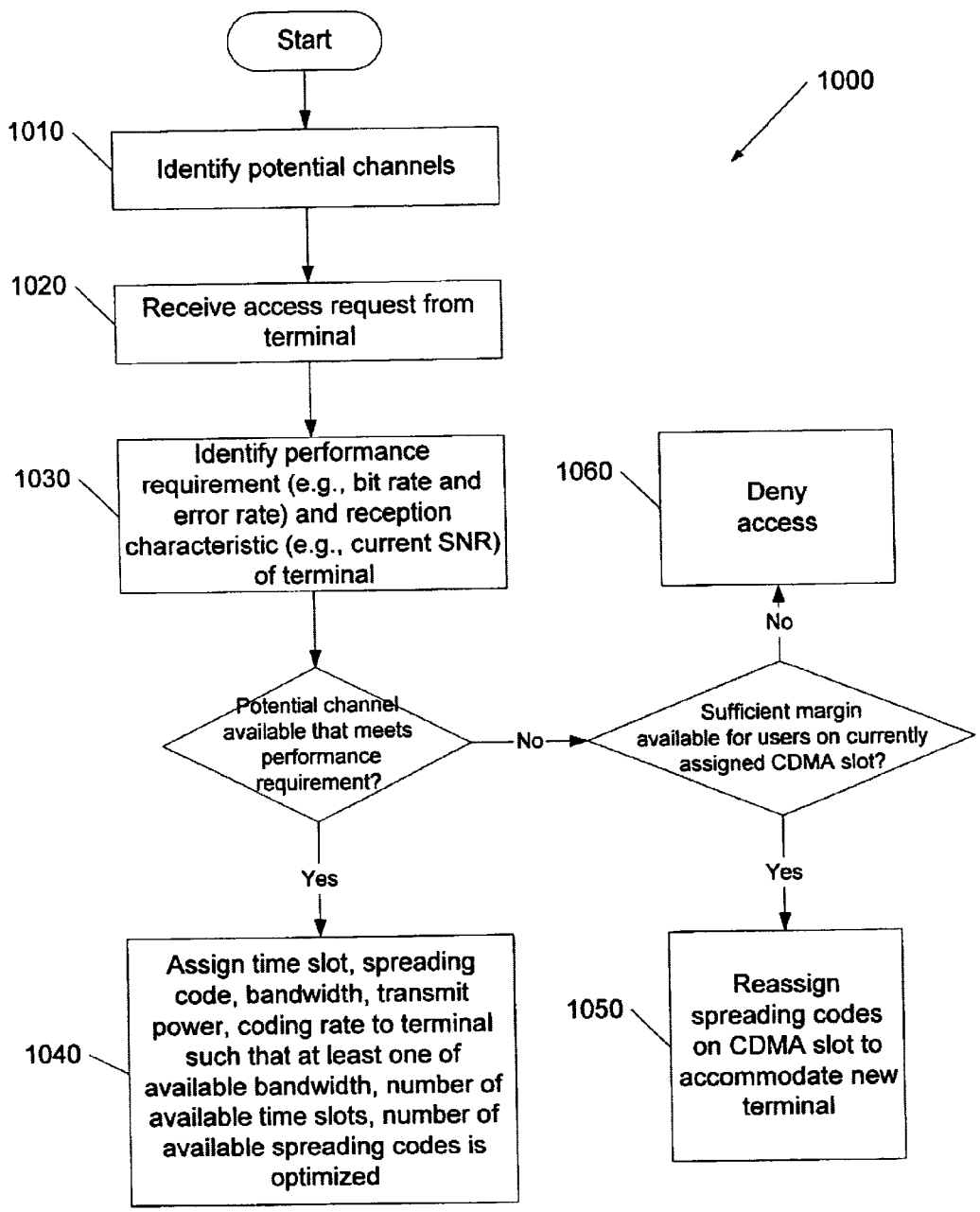

FIGS. 8–10 are flowchart illustrations illustrating exemplary operations for allocation resources in a wireless communications system according to aspects of the present invention. It will be understood that blocks of the flowchart illustrations of FIGS. 8–10, and combinations of blocks in the flowchart illustrations, can, in general, be implemented in electronic circuitry including, but not limited to, special purpose hardware such as discrete analog and/or digital circuitry, combinations of integrated circuits, or one or more application specific integrated circuits (ASICs). It will also be understood that blocks of the flowchart illustrations of FIGS. 8–10, and combinations of blocks in the flowchart illustrations, can also be implemented by computer program instructions which may be loaded onto a computer or other programmable data processing apparatus, such as the a processor or other computer in the MSC 310 of FIG. 3 and the controller 470 of the terminal 400 of FIG. 4, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 8–10 support combinations of means for performing the specified functions and combinations of steps for performing the specified functions. It will be understood that the means supported by each block of the flowchart illustrations of FIGS. 8–10, and combinations of blocks therein, can be implemented by special purpose hardware, such as the circuitry described above, software or firmware operating on special or general purpose data processors, or combinations thereof.

Exemplary resource allocation operations 800 according to an embodiment of the present invention are illustrated in FIG. 8. A wireless communications system receives an access request from a terminal (Block 810), and responsively identifies a performance requirement (e.g., bit rate and error rate) and reception condition (e.g., a current signal to noise ratio (SNR)) for the terminal (Block 820). The performance requirements may, for example, be transmitted to the system in the same message used to make the access request, while the reception conditions can be identified, for example, based on recent signal strength measurements made by the terminal and transmitted to the system. Based on the identified performance requirements and reception conditions, the system assigns the terminal a time slot, a number of spreading codes on the time slot, a coding rate (e.g., HP or normal) and a bandwidth (Block 830). The system then communicates with the terminal according to the assigned parameters (Block 840).

According to another embodiment of the present invention illustrated in FIG. 9, this allocation of time slots, spreading codes may be achieved by assigning a terminal to a "pure" TDMA slot or to a spreading-code defined subchannel of a time slot. Exemplary operations 900 according to this embodiment include receiving an access request from a terminal (Block 910), and responsively identifying a performance requirement and signal reception condition associated with the terminal (Block 920). The system then assigns an entire time slot or a subchannel of a time slot to the terminal, conditioned upon the performance requirement and reception condition (Block 930). The system then communicates with the terminal using the assigned entire time slot or subchannel (Block 940).

FIG. 10 illustrates exemplary operations 1000 for optimally allocating resources according to another aspect of the present invention. The system identifies potential channels that may be assigned to terminals (Block 1010). For example, the system may order resources in decreasing priority of bandwidth, number of spreading codes, number of time slots, transmitted power, and coding rate. From this information, the system may maintain a database of combinations of resources that are expected to meet performance requirements of potential users, thus identifying potential channels. Such a process need not be overly complicated, as a system typically will serve a limited number of service classes of terminals. In response to receipt of an access request from a terminal (Block 1020) and identification of a performance requirement and signal reception condition associated with the terminal (Block 1030), the system determines whether it has a potential channel that will meet the requesting terminals requirement. If it does, the system assigns a time slot, spreading code(s), bandwidth, transmit power and coding rate that define the potential channel to the terminal such that remaining available bandwidth, number of available time slots, number of available spreading codes is optimized (Block 1040). If none of the identified potential channels meets the terminal's needs, the system can investigate further to determine if existing users of CDMA subchannel have sufficient current link margin such that spreading codes assigned to them can be reassigned to the new user. This determination may be made, for example, based on bit error rate and other signal quality measurements performed by terminals, measurements that are commonly performed in many wireless communications systems. If the existing users have adequate margin, the spreading codes of the appropriate CDMA-subdivide time slots are reassigned to accommodate the new terminal (Block 1050). If not, access may be denied (Block 1060).

It will be appreciated that the exemplary operations of FIGS. 8–10 are offered for illustrative purposes, and that variations and alternatives to the illustrated operations fall within the scope of the present invention. In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of operating a wireless communications system including at least one base station operative to communicate on a plurality of carrier frequencies in repetitive time slots defined thereon, the method comprising:

defining a normal channel that comprises a first plurality of time slots and that provides a first level of error correction coding redundancy;

defining a high-penetration channel that comprises a second plurality of time slots and that provides a second level of error correction coding redundancy that is greater than the first level of error correction coding redundancy, the high-penetration channel including a plurality of spreading code defined subchannels; and determining which of an entire time slot of the normal channel or a spreading-code defined subchannel of a time slot of the high-penetration channel to assign to a terminal based on a communications constraint associated with the terminal.

2. A method according to claim 1, wherein the communications constraint comprises a performance requirement and a signal reception condition.

3. A method according to claim 2, wherein the performance requirement comprises at least one of an information rate requirement or an error rate requirement.

4. A method according to claim 2, wherein the signal reception condition comprises a signal to noise ratio.

5. A method according to claim 1:

wherein said step of determining which of an entire time slot of the normal channel or a spreading-code defined subchannel of a time slot of the high-penetration channel to assign to a terminal is preceded by the steps of:
identifying a single terminal;
identifying a plurality of terminals;
determining a communications constraint associated with the single terminal; and
determining respective communications constraints associated with respective ones of the plurality of terminals;

wherein said step of determining which of an entire time slot of the normal channel or a spreading-code defined subchannel of a time slot of the high-penetration channel to assign to a terminal comprises the steps of:

exclusively assigning a first time slot to the single terminal based on the communications constraint associated with the single terminal; and assigning a second time slot to the plurality of terminals based on the communications constraints associated with the plurality of terminals; and wherein the method further comprises the steps of:
communicating with the single terminal in the first time slot; and communicating with respective ones of the plurality of terminals in the second time slot using a plurality of subchannels, wherein respective ones of the plurality of subchannels are encoded according to respective spreading codes.

6. A method according to claim 5:
wherein said step of communicating with the single terminal comprises the step of communicating with the single terminal at a first information rate; and
wherein said step of communicating with the plurality of terminals comprises the step of communicating with a terminal of the plurality of terminals at a second information rate less than the first information rate.

7. A method according to claim 6:
wherein said step of communicating with the single terminal comprises the step of communicating at least one of voice information or high bit rate data; and
wherein said step of communicating with a terminal of the plurality of terminals comprises the step of communicating low bit rate data.

8. A method according to claim 5, wherein said step of communicating with respective ones of the plurality of terminals comprises the step of communicating with one terminal of the plurality of terminals over a group of subchannels of the second time slot.

9. A method according to claim 1, wherein said step of communicating with the plurality of terminals comprises the step communicating with one terminal of the plurality of terminals over a group of the subchannels.

10. A method according to claim 5:
wherein said step of communicating with the single terminal comprises the step of communicating with the single terminal using a first bandwidth; and
wherein said step of communicating with respective ones of the plurality of terminals comprises the step of communicating with one of the terminals of the plurality of terminals using a second bandwidth greater than the first bandwidth.

11. A method according to claim 5, wherein a respective one of the subchannels is encoded according to a respective scrambling mask.

12. An operating method for a wireless communications system that is operative to communicate using a plurality of time slots on a plurality of carrier frequencies, to communicate on respective subchannels on a time slot according to respective spreading codes and to communicate over a channel with a variable coding rate and a variable bandwidth, the method comprising:
determining a communications constraint associated with a terminal; and
assigning a time slot, a spreading code, an error correction coding redundancy level and a bandwidth to the terminal based on the determined communications constraint.

13. A method according to claim 12, wherein the communications constraint comprises a performance requirement and a signal reception condition.

14. A method according to claim 13, wherein the performance requirement comprises at least one of an information rate or an error rate.

15. A method according to claim 13, wherein the signal reception condition comprises a signal to noise ratio.

16. A method according to claim 12, wherein said step of assigning comprises the step of assigning a time slot, a spreading code, an error correction coding redundancy level and a bandwidth to the terminal such that at least one of an available bandwidth, a number of available time slots, a number of available spreading codes, or a transmit power is optimized.

17. A method according to claim 12, wherein the spreading code comprises a scrambling mask.

18. A wireless communications system operative to communicate on a plurality of carrier frequencies in repetitive time slots defined thereon, the system comprising:
means for defining a normal channel that comprises a first plurality of time slots distributed over the series of frames and that provides a first level of error correction coding redundancy;
means for defining a high-penetration channel that comprises a second plurality of time slots distributed over the series of frames and that provides a second level of error correction coding redundancy that is greater than the first level of error correction coding redundancy, the high-penetration channel including a plurality of spreading code defined subchannels;
means for determining a communications constraint associated with a terminal;
means, responsive to said means for determining a communications constraint, for determining which of an entire time slot of the normal channel or a spreading-code defined subchannel of a time slot of the high-penetration channel to assign to the terminal based on the determined communications constraint; and
means for communicating with the terminal on the determined entire time slot or subchannel.

19. A system according to claim 18, wherein the communications constraint comprises a performance requirement and a signal reception condition.

20. A system according to claim 19, wherein the performance requirement comprises at least one of an information rate requirement or an error rate requirement.

21. A system according to claim 19, wherein the signal reception condition comprises a signal to noise ratio.

22. A system according to claim 18:
wherein said means for determining a communications constraint comprises:
means for determining a communications constraint associated with a single terminal; and
means for determining respective communications constraint associated with respective ones of a plurality of terminals;
wherein said means for determining which one of an entire time slot of the normal channel or a spreading-code defined subchannel of a time slot of the high-penetration channel to assign to the terminal comprises:
means for exclusively assigning a first time slot to the single terminal based on the communications constraint associated with the single terminal;
means for assigning a second time slot to the plurality of terminals based on the communications constraints associated with the plurality of terminals; and wherein said means for communicating comprises:
  means for communicating with the single terminal in the first time slot; and
  means for communicating with the plurality of terminals in the second time using a plurality of subchannels, wherein respective ones of the plurality of subchannels are encoded according to respective spreading codes.

23. A system according to claim 22:
  wherein said means for communicating with the single terminal comprises means for communicating with the single terminal at a first information rate; and
  wherein said means for communicating with respective ones of the plurality of terminals comprises means for communicating with one terminal of the plurality of terminals at a second information rate less than the first information rate.

24. A system according to claim 23:
  wherein said means for communicating with the single terminal comprises means for communicating at least one of voice information or high bit rate data; and
  wherein said means for communicating with a terminal of the plurality of terminals comprises means for communicating low bit rate data.

25. A system according to claim 22, wherein said means for communicating with respective ones of the plurality of termninals comprises means for communicating with one terminal of the plurality of terminals over a group of subchannels of the second time slot.

26. A system according to claim 22, wherein said means for communicating with respective ones of the plurality of terminals comprises means for communicating with one terminal of the plurality of terminals over a group of the subchannels.

27. A system according to claim 22:
  wherein said means for communicating with the single terminal comprises means for communicating with the single terminal using a first bandwidth; and
  wherein said means for communicating with respective ones of the plurality of terminals comprises means for communicating with one of the terminals of the plurality of terminals using a second bandwidth greater than the first bandwidth.

28. A system according to claim 18, wherein a respective one of the subchannels is encoded according to a respective scrambling mask.

29. A wireless communications system operative to communicate using a plurality of time slots on a plurality of carrier frequencies, to communicate on respective subchannels on a time slot according to respective spreading codes and to communicate over a channel with a variable coding rate and a variable bandwidth, the wireless communication system comprising:
  means for determining a communications constraint associated with a terminal; and
  means, responsive to said means for determining a communications constraint, for assigning a time slot, a spreading code, an error correction coding redundancy level and a bandwidth to the terminal based on the determined communications constraint.

30. A system according to claim 29, wherein the communications constraint comprises a performance requirement and a signal reception condition.

31. A system according to claim 30, wherein the performance requirement comprises at least one of an information rate or an error rate.

32. A system according to claim 30, wherein the signal reception condition comprises a signal to noise ratio.

33. A system according to claim 29, wherein said means for assigning comprises means for assigning a time slot, a spreading code, an error correction coding rate and a bandwidth to the terminal such that at least one of an available bandwidth, a number of available time slots, a number of available spreading codes, or a transmit power is optimized.

34. A system according to claim 29, wherein the spreading code comprises a scrambling mask.

35. A wireless communications system, comprising:
  a base station operative to communicate using a plurality of time slots on a plurality of carrier frequencies, to communicate on respective subchannels on a time slot according to respective spreading codes and to communicate over a channel with a variable coding rate and a variable bandwidth; and
  a resource allocator operatively associated with the base station and operative to determine a communications constraint associated with a terminal and to assign a time slot, a spreading code, an error correction coding redundancy level and a bandwidth to the terminal based on the determined communications constraint,
    wherein said base station is responsive to said resource allocator to communicate with the terminal according to the assigned time slot, spreading code, coding rate and bandwidth.

36. A system according to claim 35, wherein the communications constraint comprises a performance requirement and a signal reception condition.

37. A system according to claim 36, wherein the performance requirement comprises at least one of an information rate or an error rate.

38. A system according to claim 36, wherein the signal reception condition comprises a signal to noise ratio.

39. A system according to claim 35, wherein the resource allocator is operative to assign a time slot, a spreading code, an error correction coding redundancy level and a bandwidth to the terminal such that at least one of an available bandwidth, a number of available time slots, a number of available spreading codes, or a transmit power is optimized.

40. A system according to claim 35, wherein the spreading code comprises a scrambling mask.

41. A wireless communications terminal for communicating with a wireless communications system, the terminal comprising:
  means for informing the system of a communications constraint associated with the terminal; and
  means for communicating with the system using a time slot, a spreading code, an error correction coding redundancy level and a bandwidth assigned to the terminal by the system based on the determined communications constraint.

42. A terminal according to claim 41, wherein the communications constraint comprises a performance requirement and a signal reception condition.

43. A terminal according to claim 42, wherein the performance requirement comprises at least one of an information rate or an error rate.

44. A terminal according to claim 42, wherein the signal reception condition comprises a signal to noise ratio.

45. A terminal according to claim 41, wherein said means for communicating comprise means for communicating with the system using an entire time slot or a subchannel of a time slot defined by a spreading code.

46. A system according to claim 45, wherein the spreading code comprises a scrambling mask.

* * * * *